United States Patent [19]

Carpenter

[11] Patent Number: 4,573,845

[45] Date of Patent: Mar. 4, 1986

[54] SELF-LOADING TRAILER

[76] Inventor: Marvin L. Carpenter, Rte. 2, Box 300, Diana, Tex. 75640

[21] Appl. No.: 661,231

[22] Filed: Oct. 15, 1984

[51] Int. Cl.⁴ .................... A01D 90/08; B60P 1/14
[52] U.S. Cl. .................... 414/24.5; 414/469; 414/493; 414/494; 414/515
[58] Field of Search ............. 414/24.5, 24.6, 477, 414/478, 494, 111, 350, 469, 480, 489, 493, 509, 515, 542

[56] References Cited

U.S. PATENT DOCUMENTS

| 3,522,894 | 8/1970 | Tornheim | 414/469 |
|---|---|---|---|
| 3,790,013 | 2/1974 | Smith | 414/469 X |
| 4,008,818 | 2/1977 | Neely, Jr. | 414/509 X |
| 4,015,737 | 4/1977 | Wright et al. | 414/24.5 |
| 4,050,598 | 9/1977 | Schurz | 414/24.5 |
| 4,329,102 | 5/1982 | Gray | 414/24.5 |
| 4,412,768 | 11/1983 | Baver et al. | 414/24.5 |
| 4,478,547 | 10/1984 | Den Boer | 414/24.5 |

Primary Examiner—Robert J. Spar
Assistant Examiner—Janice Krizek
Attorney, Agent, or Firm—Harvey B. Jacobson

[57] ABSTRACT

A trailer particularly for loading and unloading hay bales has a pivotal loading carriage at its rearward end with loading forks which can be backed under a bale and used to lift the bale onto the trailer by pivotal movement of the carriage. The trailer includes a longitudinally movable carrier with a releasable fork for moving the bale from the carriage toward a forward end of the trailer, and also for unloading bales by reverse movement of the carrier. A winch and cable drive is provided both for moving the carrier lengthwise along the trailer in forward and reverse directions, and for providing pivotal movement of the carriage when the carrier is received therein.

14 Claims, 10 Drawing Figures

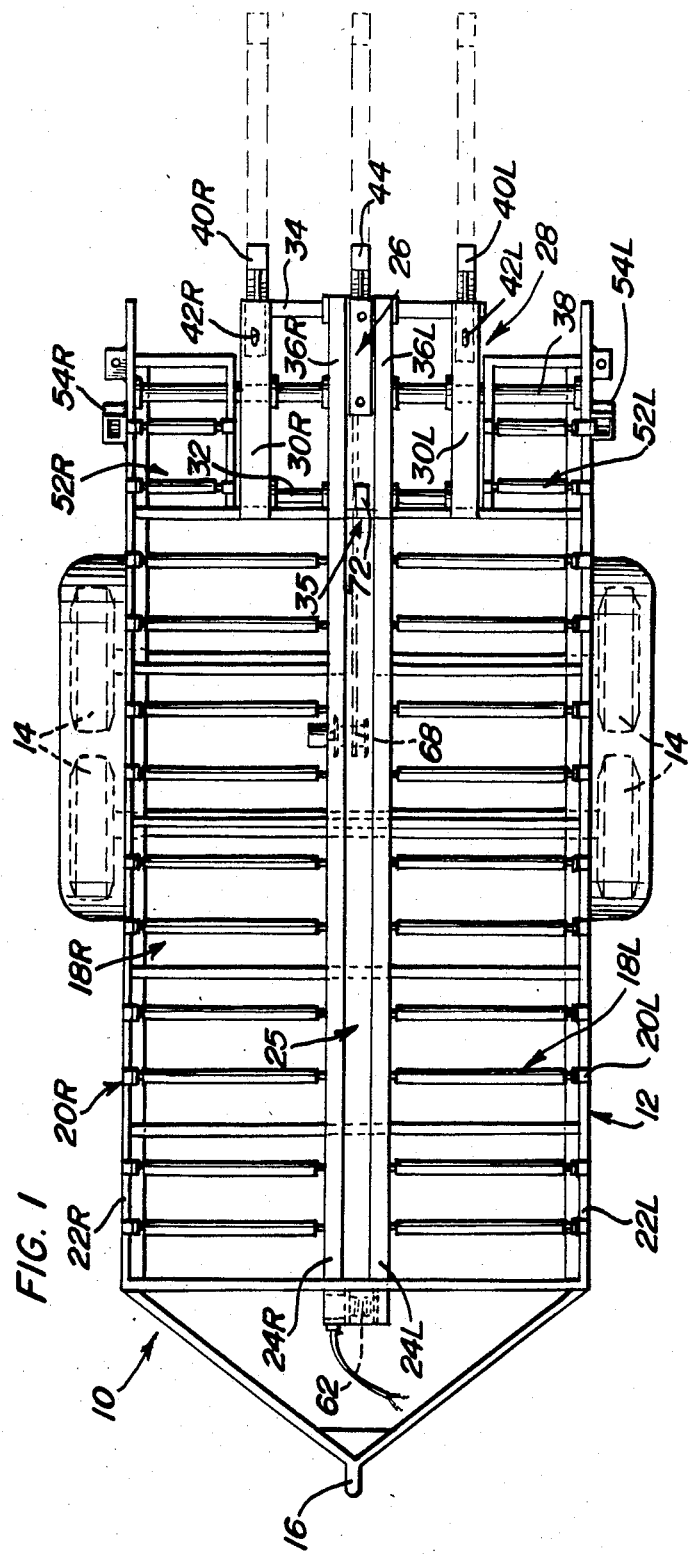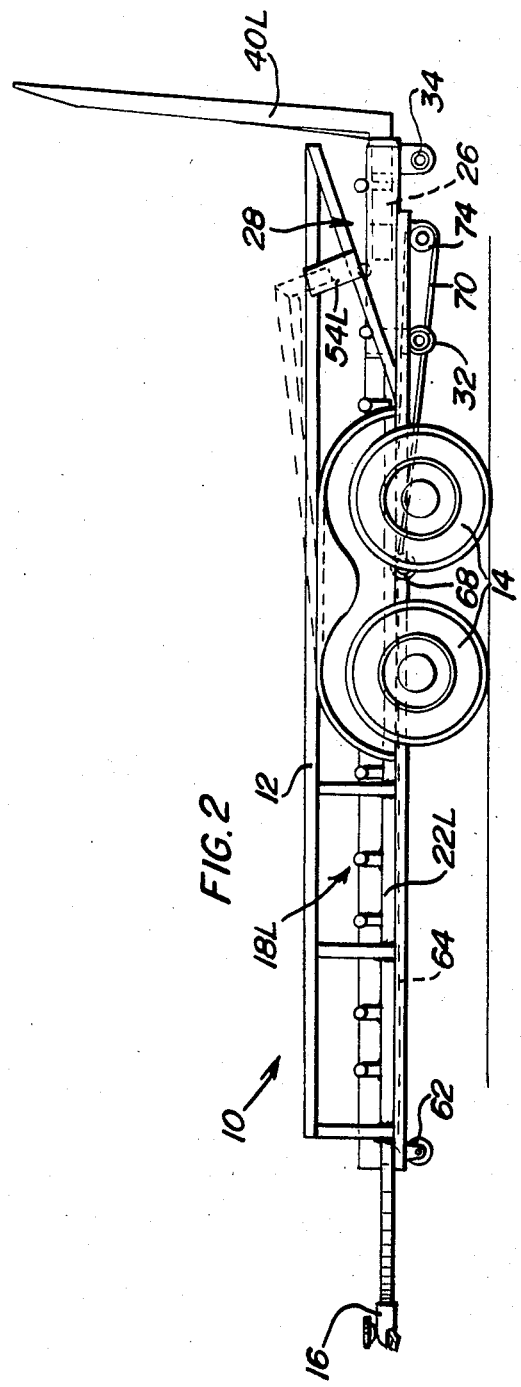

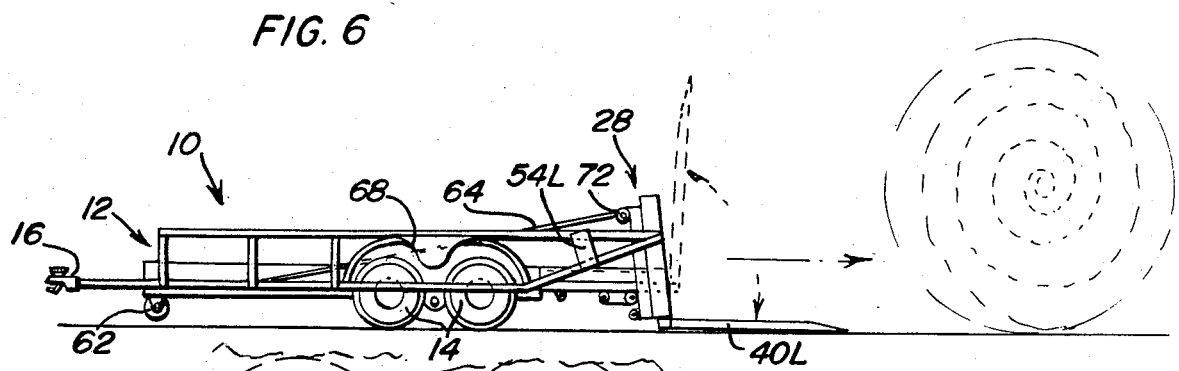
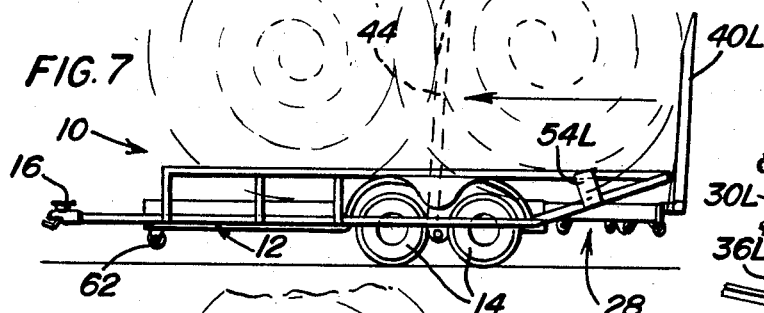
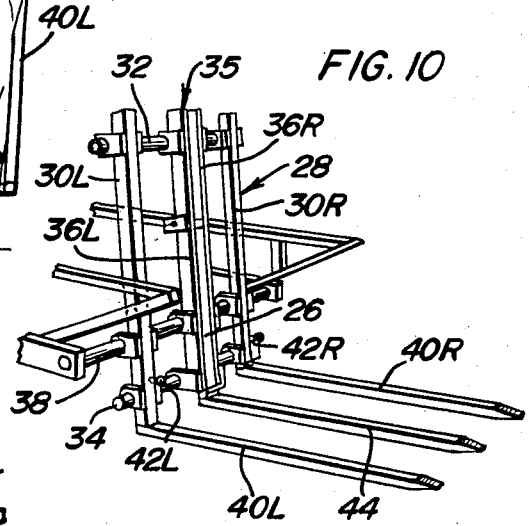
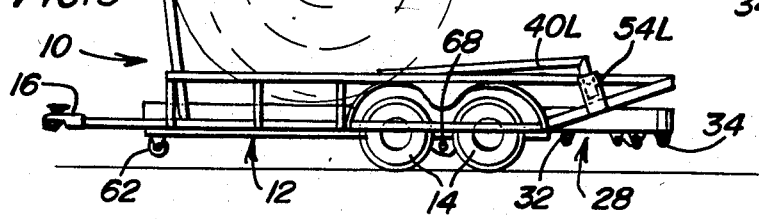
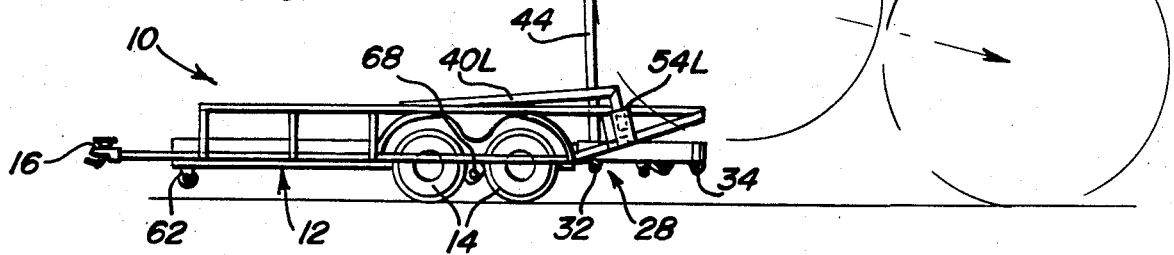

SELF-LOADING TRAILER

BACKGROUND OF THE INVENTION

This invention relates to a self-loading and unloading vehicle Particularly for farm and like uses, for loading and unloading articles such as round hay bales. Conveniently, the vehicle may be in the form of a trailer which can be towed by a tractor or the like, although the invention may also be embodied in a self-propelled vehicle.

Traditionally, hay bales in the field have been manually loaded onto, and unloaded from transport vehicles, an operation generally requiring a vehicle operator and at least one loader. A self-loading and unloading vehicle in accordance with the invention allows these operations to be carried out rapidly and effectively by a single person.

STATEMENT OF PRIOR ART

Applicant is aware of the following U.S. Patents the relevance of which is that they relate to bale-handling devices and the like. None of the patents, however, discloses a self-loading and unloading vehicle having the features of the present invention.

U.S. Pat. No. 3,877,595—Apr. 15, 1975
U.S. Pat. No. 3,896,956—July 29, 1975
U.S. Pat. No. 4,015,737—Apr. 5, 1977
U.S. Pat. No. 4,044,967—Aug. 30, 1977
U.S. Pat. No. 4,253,786—Mar. 3, 1981
U.S. Pat. No. 4,329,102—May 11, 1982

SUMMARY OF THE INVENTION

A self-loading and unloading vehicle in accordance with the invention comprises an elongate wheeled frame having a load surface with a forward end and a rear loading end for loading and unloading articles onto and off of the loading surface, a loading carriage pivotally mounted on the rear end of the frame, the carriage and frame having aligned longitudinally extending track sections for guiding a traveling carrier in lengthwise movement along the frame and carriage, means for releasably securing a loading fork to the carrier to project upwardly of the load surface during lengthwise movement of the carrier, winch means on the frame, cable means connected between the winch means and the carrier for moving the carrier lengthwise along the track sections in forward and reverse directions and for effecting pivotal movements of the carriage when the carrier is received in the carriage track section between a loading position in which the loading fork is substantially level with the ground behind the vehicle to an upper position whereby the carriage is effective to lift an article onto the vehicle.

The carriage may have provision for the releasable attachment of a pair of additional loading forks laterally outwardly of the carrier loading fork. The loading surface may be defined by lengthwise arrays of transversely extending rollers on opposite sides of the track sections.

During loading of hay bales, for example, the vehicle with the carriage in loading position may be reversed so that the loading forks push under a bale, and the winch and cable means may be then be operated in forward direction so as to effect pivotal movement of the carriage causing the loading forks to lift the bale onto the rear of the load surface. Continued forward operation of the winch and cable means advances the carrier along the track sections so that the carrier loading fork pushes the bale toward the front of the vehicle. Reversal of the winch and cable means then moves the carrier rearwardly along the track sections and when it reaches a terminal position in the carriage track section causes pivoting of the carriage down to loading position for loading the next bale. The process may then be repeated with successive bales which are thus loaded one behind another on the load surface.

For unloading the bales, all the loading forks are detached, and the carrier is moved to the forward end of the frame track section under the loaded bales. The carrier loading fork is then attached to the forward end of the carrier so that reverse movement of the carrier along the track sections causes the carrier fork to push the bales back along the load surface and discharge them from the rear end of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a plan view of a self-loading and unloading farm trailer in accordance with the invention.

FIG. 2 is a side view of the trailer.

FIGS. 6–9 are side views of the trailer showing a sequence of steps performed in loading hay bales onto and unloading them from the trailer.

FIG. 10 is a perspective view of the rear end of the trailer showing the loading carriage in lowered position.

DESCRIPTION OF THE PREFERRED EMBODIMENT

Figure 3:
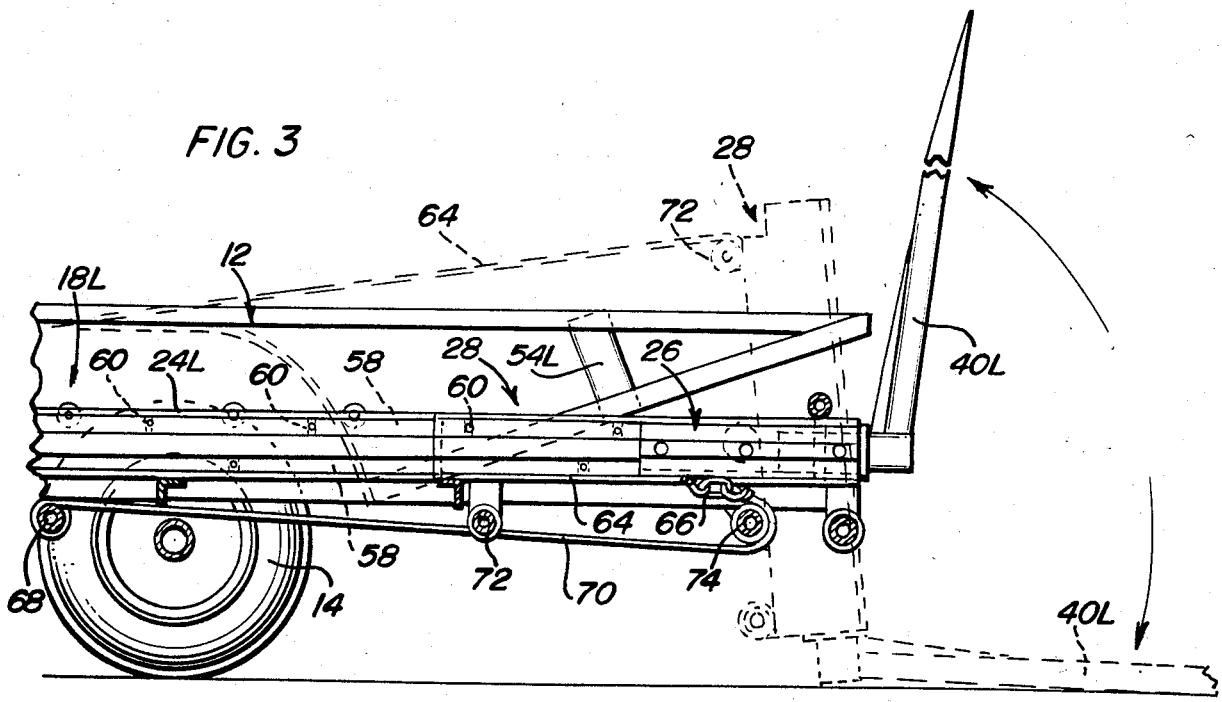
FIG. 3 is an enlarged side view of a rear end of the trailer illustrating pivotal movements effected by a loading carriage forming part of the trailer.
Figure 4:
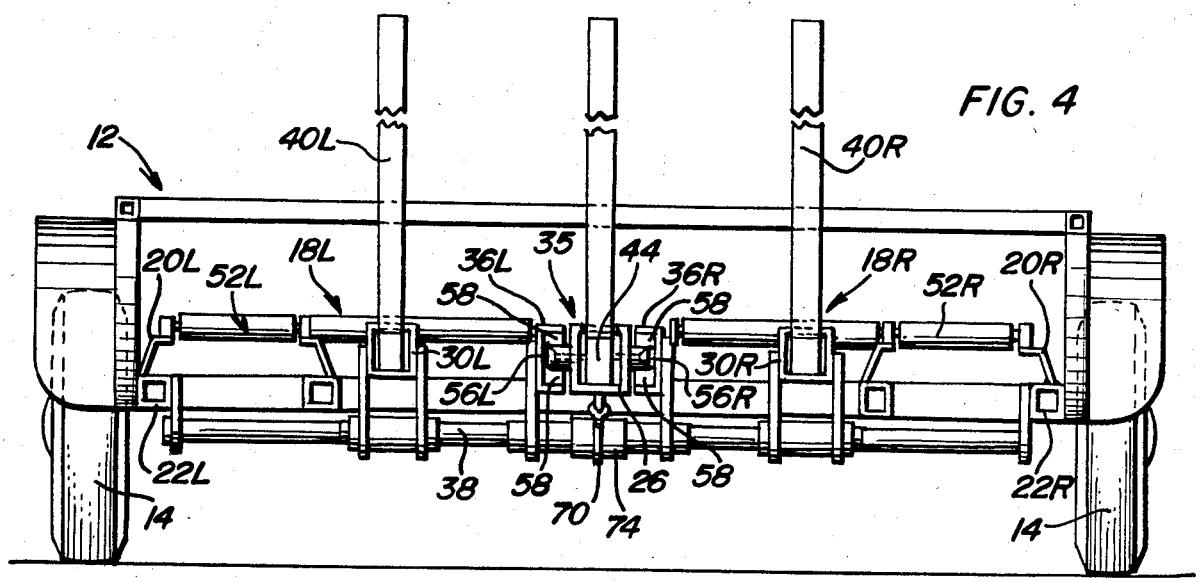
FIG. 4 is an enlarged end view of the trailer.

The illustrated self-loading and unloading vehicle comprises a trailer 10 having a frame 12 on wheels 14, and a hitch 16 at its forward end for attaching the trailer to a farm tractor or the like to be towed thereby.

The trailer 10 has a horizontal load surface defined by left- and right-hand lengthwise arrays of elongate transversely disposed rollers 18L and 18R, the rollers being journaled between brackets 20L, 20R on outer longitudinal frame members 22L and 22R and inner longitudinal frame members 24L and 24R. The inner longitudinal frame members are channel-shaped and together form a longitudinal frame track section 25 for guiding a traveling carrier 26 in lengthwise forward and reverse movement along the frame, as will be described.

At its rear or loading end frame 12 is provided with a pivotal loading carriage 28 (seen clearly in FIG. 10) comprising left and right arms 30L and 30R, crossbraces 32, 34, and a central carriage track section 35 formed from left and right channel-section members 36L, 36R which align and conform with longitudinal frame members 24L, 24R. Carriage 28 is pivotally mounted between the ends of outer frame members 22L, 22R by a pivot shaft 38. Left and right arms 30L, 30R have hollow ends for receipt of respective left and right loading forks 40L, 40R in the form of angled tines which may be releasably secured in the arms by pins 42L, 42R or the like.

Figure 5:
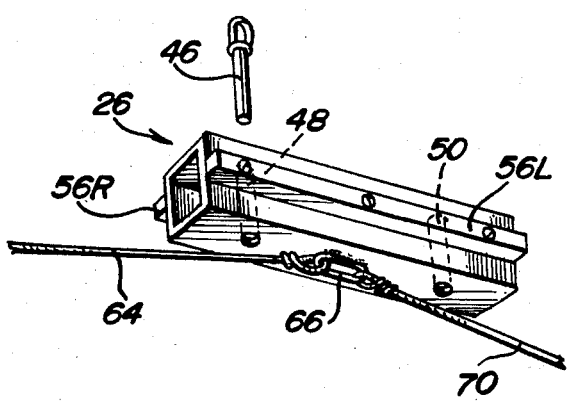
FIG. 5 is a perspective view of a central loading fork carrier connected to forward and reverse cables.

Carriage 28 has an upper position shown in solid line in FIGS. 1–4 wherein the arms 30L, 30R are substantially flush with rollers 18L and 18R, and track section 35 forms a continuation of track section 25, so that carrier 26 can be moved between and along the respective track sections. Carriage 28 has a lowered position, shown dotted in FIGS. 1–4 and in solid line in FIG. 10, wherein forks 40L, 40R are substantially flush with the ground. It should here be noted that carrier 26 is a hollow rectangular form for releasably receiving a central loading fork 44 of like form to forks 40L, 40R at either end of the carrier, the fork being retained by a pin 46 fitting in openings 48, 50 of the carrier (FIG. 5) and corresponding openings (not shown) in the fork, in like manner to forks 40L, 40R. Carrier 26 has an extreme rearward position in track section 35 (it comes up against a suitable stop, not shown) wherein fork 44 is aligned with forks 40L, 40R, this position of the carrier being shown in solid line in the drawings.

The load surface of the trailer is made continuous by the provision of short transverse rollers 52L, 52R at the loading end adjacent carriage 28, and the frame includes left and right receiving pockets 54L, 54R for stowing forks 40L, 40R when they are not in use.

Carrier 26 (see FIG. 5) is provided with left and right bearing bars 56L, 56R which engage respectively with upper and lower guide or wear bars bolted internally to the respective left and right channel-section members of the track sections. The wear bars are shown at 58 (FIG. 3) and may be vertically adjustable to accommodate carrier wear, for example, by having bolt and slot connections 60 (FIG. 3) with the respective channel members. The carrier bearing bars thus run along the wear bars to provide guidance of the carrier in its forward and reverse movement along track sections 25 and 35.

Drive means for moving the carrier 26 along the track sections includes a first electric winch 62 mounted at the front end of the trailer, a first cable 64 connecting the first winch to an eye 66 on the bottom of the carrier, the cable passing generally along track section 25, a second electric winch 68 mounted under track section 25, and a second cable 70 connecting the second winch to eye 66. The first cable is passed over a forward cable roller 72 centrally located on carriage cross-brace 32, and the second cable 70 is passed around a rearward cable roller 74 centrally located on carriage pivot shaft 38. Operation of the first winch 62 paying in cable 64 is effective to move carrier 26 forwardly along the track sections, and operation of the second winch paying in cable 70 is effective to move carrier 26 rearwardly along the track sections. The winches may, for example, be battery operated and may be controlled by the tractor operator from the tractor seat. An additional control may, however, be provided, if required, at the rear of the trailer. Also, winches 62 and 68 may be replaced by a single reversible winch with an endless cable.

To load bales on the trailer, carrier 26 is brought to its rearmost position in track section 35 by operation of the second winch 68, all of the loading forks being secured in their operative positions. Continued operation of the second winch then pulls the carriage 28 into the downward loading position (shown in solid line in FIG. 6) so that the forks can be backed under the bale to be loaded. The carrier is then pivoted upwardly by operation of the first winch 62 paying in cable 64 so that the bale is loaded onto the rear end of the trailer. Continued operation of the first winch then causes carrier 26 to be advanced along track sections 35 and 25 so that the central fork 44 pushes the loaded bale toward the front of the trailer (FIG. 7). The loading procedure can then be repeated for successive bales.

To unload the trailer, all of the loading forks are removed, and carrier 26 is brought to the front of the trailer by operation of winch 62. (There is a stop, not shown, for the carrier at the front end of track section 25.) Then, central fork 44 is attached to the front end of carrier 26 (FIG. 8). Operation of winch 68 paying in cable 70 then moves carrier 26 back down the track sections, with fork 44 pushing the bales off of the back of the trailer (FIG. 9). In order to insure pushing the last bale off the trailer, the length of carrier 26 should be about one-half the diameter of the bales.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A self-loading and unloading vehicle comprising an elongate wheeled frame having a load surface with a forward end and a rear loading end for loading and unloading articles onto and off of the load surface, a loading carriage pivotally mounted on the rear end of the frame about an axis extending transversely of the frame for lifting articles onto the load surface by pivotal upward movement of the carriage from a loading position to an upper position, a first loading fork releasably associated with the carriage to extend, in the loading position of the carriage, behind the frame substantially at ground level for backing under an article to be loaded and to project, in the upper position of the carriage, above the load surface, the carriage and frame having aligned longitudinally extending respective carriage and frame track sections disposed in lengthwise register in the upper position of the carriage, a carrier mounted for lengthwise movement along the track sections between a forward terminal position at the forward end of the load surface in the frame track section, and a rearward terminal position at the rear end of the load surface in the carriage track section, a second loading fork releasably attachable to the carrier for moving articles along the load surface by forward and reverse movement of the carrier along the track sections, the carrier in the rearward terminal position being pivotably movable along with the carriage between the loading and upper positions thereof with the first and second loading forks in substantial alignment, and winch and cable means associated with the frame for moving the carrier lengthwise along the track sections in forward and reverse directions and for effecting pivotal movements of the carriage between the loading and upper positions when the carrier is in the rearward terminal position.

2. The invention of claim 1 wherein the carriage comprises a pair of longitudinal arms with the carriage track section being disposed substantially therebetween, one of said arms being formed at its rear end for receipt of the first loading fork, and the other of said arms being formed at its rear end for receipt of a third loading fork.

3. The invention of claim 1 wherein the track sections each comprise respective left and right inwardly directed channel-section frame members for guidingly receiving the carrier therebetween.

4. The invention of claim 1 wherein the track sections each comprise respective left and right longitudinal frame members and upper and lower vertically adjustable wear bars extending legnthwise along the inner surface of each longitudinal frame member, the wear bars defining a space therebetween for guidingly receiving a bearing portion of the carrier, the space being adjustable by adjustment of the wear bars to accommodate carrier wear.

5. The invention of claim 4 wherein the carrier is of hollow configuration for receipt of the second loading fork and has left and right outwardly extending bearing bars defining bearing portions for receipt between the respective wear bars of the track sections.

6. The invention of claim 5 wherein the carrier includes means for selectively releasably attaching the second loading fork in the forward end of the carrier for moving articles rearwardly along the load surface, and in the rearward end of the carrier for moving articles forwardly along the load surface.

7. The invention of claim 1 wherein the track sections comprise respective longitudinally extending elongate members disposed substantially centrally of the frame and carriage, and wherein the load surface is defined by left and right longitudinal arrays of transverse rollers extending the length of the frame on opposite sides of the frame track section.

8. The invention of claim 7 including shorter left and right load surface-defining rollers at the rear of the frame on opposite sides of the carriage.

9. The invention of claim 1 wherein the winch and cable means comprises a first winch at the front of the frame, a first cable connected between the first winch and the carrier, the first cable extending over a first cable roller at a forward end of the carriage, a second winch on the frame, a second cable connected between the second winch and the carrier around a second cable roller toward the rear of the carriage, whereby operation of the second winch paying in the second cable is effective to move the carrier rearwardly in the track sections and to pivot the carriage downwardly to loading position when the carrier is in the rearward terminal position, and operation of the first winch paying in the first cable is effective for pivoting the carriage from the loading position to the upper position and to move the carrier forwardly along the track sections.

10. The invention of claim 9 wherein the cables are connected to a common connection eye on the bottom of the carrier.

11. The invention of claim 1 wherein the vehicle is in the form of a trailer having a hitch at its forward end for connecting same to a farm tractor or the like for towing the trailer.

12. A self-loading and unloading trailer for use when towed by a farm tractor or the like in loading and unloading articles such as hay bales, the trailer comprising a wheeled frame having hitch means at a forward end thereof for connection to the tractor or the like, and a loading and unloading carriage at a rear loading end thereof, the carriage being pivotally mounted about a transverse axis at the rear of the frame and comprising elongate arms for receipt in the rearward ends thereof of respective releasable loading forks, the cariage having a lowered loading position wherein the forks extend behind the frame substantially level with the ground for backing under an article to be loaded, the carriage being pivotally movable from the loading position to an elevated position causing the forks to lift the article onto the rear end of the frame, aligned lengthwise track sections in the frame and carriage respectively, a carrier with a releasable fork mounted for movement along the track sections for moving the article lengthwise toward the forward end of the frame and for unloading articles from the frame by reverse movement of the carrier along the track sections, and drive means for selectively moving the carrier lengthwise in forward and reverse directions along the track sections and for pivoting the loading and unloading carriage between the loading and elevated positions.

13. The invention of claim 12 wherein the drive means comprises winch and cable means for moving the carrier lengthwise along the track sections, the cable means extending over cable rollers associated with the carriage whereby selective forward and reverse operation of the winch and cable means when the carrier is located in the carriage track section is effective for pivoting the carriage between the respective loading and elevated positions.

14. The invention of claim 13 wherein the frame has a load surface on which the article is received from the loading forks, the load surface being defined by longitudinally extending left and right arrays of transverse rollers on opposite sides of the respective track sections.

* * * * *